US012802682B2

(12) United States Patent
He et al.

(10) Patent No.: US 12,802,682 B2
(45) Date of Patent: Nov. 17, 2026

(54) AUDIO GENERATION METHOD, METHOD OF TRAINING MODEL, DEVICE, AND STORAGE MEDIUM

(71) Applicant: Beijing Baidu Netcom Science Technology Co., Ltd., Beijing (CN)

(72) Inventors: Huihui He, Beijing (CN); Leyi Wang, Beijing (CN); Minghao Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 167 days.

(21) Appl. No.: 18/889,742

(22) Filed: Sep. 19, 2024

(65) Prior Publication Data

US 2025/0363977 A1 Nov. 27, 2025

(30) Foreign Application Priority Data

May 23, 2024 (CN) ......................... 202410650463.6

(51) Int. Cl.
*G10L 13/08* (2013.01)

(52) U.S. Cl.
CPC .................................... *G10L 13/08* (2013.01)

(58) Field of Classification Search
None
See application file for complete search history.

(56) References Cited

U.S. PATENT DOCUMENTS

| | | | | |
|---|---|---|---|---|
| 2021/0350795 | A1* | 11/2021 | Kenter | G06N 3/0455 |
| 2022/0277728 | A1* | 9/2022 | Zhang | G06N 3/045 |
| 2023/0131494 | A1* | 4/2023 | Zhou | G06F 40/30 704/260 |
| 2023/0298562 | A1* | 9/2023 | Pan | G06F 40/289 704/260 |
| 2024/0282033 | A1* | 8/2024 | Su | G06T 13/205 |
| 2024/0339104 | A1* | 10/2024 | Min | G10L 13/033 |
| 2025/0363977 | A1* | 11/2025 | He | G10L 13/08 |
| 2026/0045248 | A1* | 2/2026 | Gu | G06N 3/0455 |
| 2026/0065891 | A1* | 3/2026 | He | G10L 13/027 |
| 2026/0112356 | A1* | 4/2026 | Lin | G06F 40/30 |

* cited by examiner

*Primary Examiner* — Jonathan C Kim
(74) *Attorney, Agent, or Firm* — Keating & Bennett, LLP

(57) ABSTRACT

An audio generation method, a method of training an audio generation model, an electronic device, and a storage medium, which relate to a field of an artificial intelligence technology, in particular to fields of deep learning, large model and audio synthesis technologies. The audio generation method includes: fusing a target phoneme feature of a target text and a target semantic feature of the target text to obtain a target fusion feature; obtaining an encoding feature according to the target fusion feature, a reference fusion feature and a reference audio feature, where the reference fusion feature is obtained by fusing a reference phoneme feature of a reference text and a reference semantic feature of the reference text, and the reference audio feature is determined according to a reference audio corresponding to the reference text; and decoding the encoding feature to obtain a target audio corresponding to the target text.

19 Claims, 5 Drawing Sheets

200

AUDIO GENERATION METHOD, METHOD OF TRAINING MODEL, DEVICE, AND STORAGE MEDIUM

This application claims the benefit of priority to Chinese Patent Application No. 202410650463.6, filed on May 23, 2024. The entire contents of this application are hereby incorporated herein by reference.

TECHNICAL FIELD

The present disclosure relates to a field of an artificial intelligence technology, in particular to fields of deep learning, large model and audio synthesis technologies, and may be applied to speech reading assistants, speech content creation, speech education and training, and other scenarios. More specifically, the present disclosure provides an audio generation method, a method of training an audio generation model, an electronic device, and a storage medium.

BACKGROUND

With a development of an artificial intelligence technology, it is possible to generate a target audio whose content is consistent with a target text and timbre, emotion, and so on are similar to a reference audio.

SUMMARY

The present disclosure provides an audio generation method, a method of training an audio generation model, a device, and a storage medium.

According to an aspect of the present disclosure, an audio generation method is provided, including: fusing a target phoneme feature of a target text and a target semantic feature of the target text to obtain a target fusion feature; obtaining an encoding feature according to the target fusion feature, a reference fusion feature and a reference audio feature, where the reference fusion feature is obtained by fusing a reference phoneme feature of a reference text and a reference semantic feature of the reference text, and the reference audio feature is determined according to a reference audio corresponding to the reference text; and decoding the encoding feature to obtain a target audio corresponding to the target text.

According to an aspect of the present disclosure, a method of training an audio generation model is provided, including: fusing a target phoneme feature of a target sample text and a target semantic feature of the target sample text to obtain a target fusion feature; inputting the target fusion feature, a reference fusion feature and a reference sample audio feature into the audio generation model to obtain an encoding feature, where the reference fusion feature is obtained by fusing a reference phoneme feature of a reference sample text and a reference semantic feature of the reference sample text, and the reference audio feature is determined according to a reference sample audio corresponding to the reference sample text; decoding the encoding feature to obtain a target sample audio corresponding to the target sample text; and training the audio generation model according to the target sample audio and a target audio label of the target sample text.

According to another aspect of the present disclosure, an electronic device is provided, including: at least one processor; and a memory communicatively connected to the at least one processor, where the memory stores instructions executable by the at least one processor, and the instructions, when executed by the at least one processor, are configured to cause the at least one processor to implement the methods provided in the present disclosure.

According to another aspect of the present disclosure, a non-transitory computer-readable storage medium having computer instructions therein is provided, and the computer instructions are configured to cause a computer to implement the methods provided in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Figure 1:
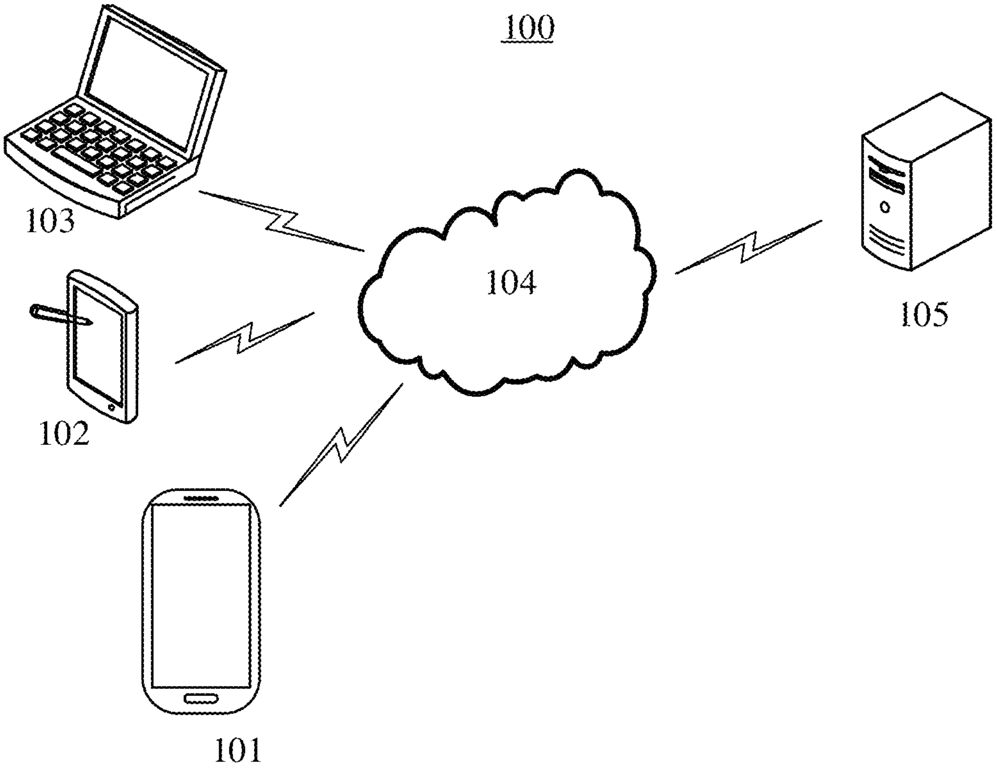
FIG. 1 shows a schematic diagram of an exemplary system architecture to which an audio generation method and an audio generation apparatus may be applied according to an embodiment of the present disclosure.

Exemplary embodiments of the present disclosure will be described below with reference to accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

An audio synthesis technology may be applied to speech reading assistants, speech content creation, speech education and training, and other scenarios. For example, based on audio books, speech broadcasting, speech guidance, etc., it is possible to provide a user with a speech reading service to assist the visually impaired in reading. For example, based on speech advertising, speech broadcasting, speech novels, etc., it is possible to generate speech content through the audio synthesis technology to meet the needs of different scenarios. For example, based on speech courses, speech answering systems, etc., it is possible to provide a personalized and interactive education and training service through the audio synthesis technology.

In some embodiments, Emotivoice model may support an emotion synthesis function to generate a speech with a wide range of emotions including happiness, excitement, sadness, anger, etc. The emotion synthesis function refers to reading a corresponding text in a specific emotional tone, rather than imitating non-verbal communication such as laughing, crying, coughing, pauses, etc. of a user. This model may only support generating a speech with specific timbres and specific emotions and is difficult to be trained.

In some embodiments, an audio synthesis model (e.g., bark) may generate highly realistic multilingual audio and other audio (e.g., music, background noise, sound effects, etc.). This model may further generate non-verbal communication, such as laughing, sighing, and crying, but is difficult to synthesize audio with Chinese intonation.

In some embodiments, Paddle Speech Text-to-Speech Synthesis (PaddleSpeech-TTS) model may support sound libraries of various styles and may be used to easily replace different acoustic models, vocoders, inference engines, etc. in different languages. However, it is difficult for this model to generate an emotional speech, and a customized speech requires a large amount of training corpus.

In some embodiments, Bidirectional encoder representation from transformer-variational inference text-to-speech (BertVITS) model combines a bidirectional encoder representation from transformer (Bert) model and a variational inference with adversarial learning for end-to-end Text-to-Speech (VITS) model. This model may generate a speech that is very similar to real person in terms of timbre. This model may support customized speech training, but requires a long training dataset and does not support customized Chinese speech synthesis with zero-shot and few-shot.

In some embodiments, an audio synthesis model (MeloTTS) may perform real-time speech synthesis using a central processing unit (CPU), but may only support Chinese speech synthesis with one timbre. This model may be trained, but requires users to construct the corpus by themselves and does not support timbre reproduction in a case of zero-shot or few-shot.

In order to generate a speech having high-quality timbre, emotion and other information, the present disclosure provides an audio generation method, which will be described below.

FIG. 1 shows a schematic diagram of an exemplary system architecture to which an audio generation method and an audio generation apparatus may be applied according to an embodiment of the present disclosure. It should be noted that FIG. 1 is merely an example of the system architecture to which embodiments of the present disclosure may be applied, so as to help those skilled in the art understand technical contents of the present disclosure. However, it does not mean that embodiments of the present disclosure may not be applied to other devices, systems, environments or scenarios.

As shown in FIG. 1, a system architecture 100 according to such embodiments may include terminal devices 101, 102 and 103, a network 104, and a server 105. The network 104 is a medium for providing a communication link between the terminal devices 101, 102, 103 and the server 105. The network 104 may include various connection types, such as wired and/or wireless communication links, etc.

The terminal devices 101, 102 and 103 may be used by a user to interact with the server 105 through the network 104 to receive or send messages, etc. The terminal devices 101, 102 and 103 may be various electronic devices having display screens and supporting web browsing, including but not limited to smart phones, tablet computers, laptop computers, and desktop computers, etc.

The server 105 may be various types of servers providing various services. For example, the server 105 may be a background management server that provides support for a website browsed by the user using the terminal devices 101, 102, 103 (only for example). The background management server may analyze and process a received user request and other data, and feed back a processing result (such as webpage, information or data acquired or generated according to the user request) to the terminal device.

It should be noted that the audio generation method provided in embodiments of the present disclosure may generally be performed by the server 105. Accordingly, the audio generation apparatus provided in embodiments of the present disclosure may be generally arranged in the server 105. The audio generation method provided in embodiments of the present disclosure may also be performed by a server or server cluster different from the server 105 and capable of communicating with the terminal devices 101, 102, 103 and/or the server 105. Accordingly, the audio generation apparatus provided in embodiments of the present disclosure may also be arranged in a server or server cluster different from the server 105 and capable of communicating with the terminal devices 101, 102, 103 and/or the server 105.

Figure 2:
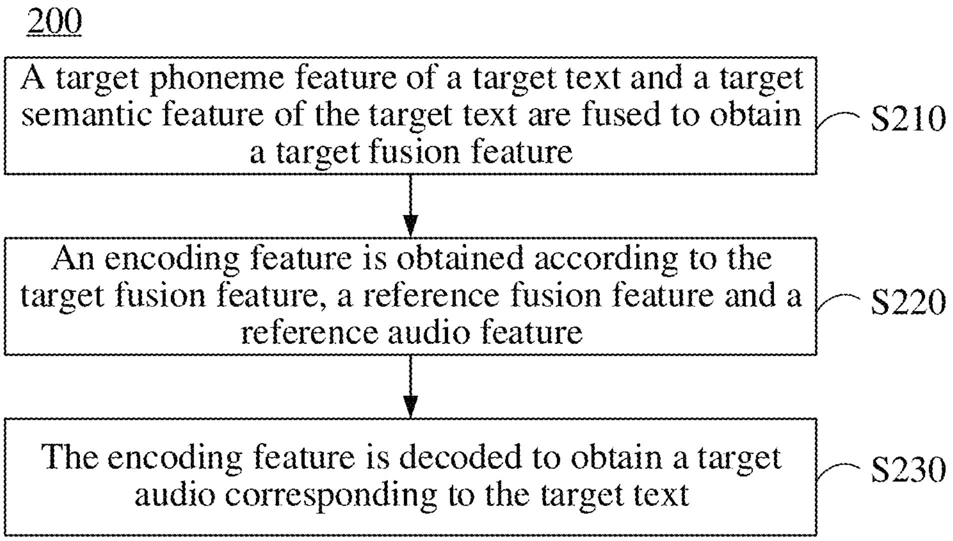
FIG. 2 shows a flowchart of an audio generation method according to an embodiment of the present disclosure.

FIG. 2 shows a flowchart of an audio generation method according to an embodiment of the present disclosure.

As shown in FIG. 2, a method 200 may include operation S210 to operation S230.

In operation S210, a target phoneme feature of a target text and a target semantic feature of the target text are fused to obtain a target fusion feature.

In embodiments of the present disclosure, the target text may include one or more target characters. For example, the character may be a character in various languages, such as Chinese character, English character, German character, etc.

In embodiments of the present disclosure, the target phoneme feature may include at least one target phoneme sub-feature, and each target character may correspond to one or more target phoneme sub-features.

In operation S220, an encoding feature is obtained according to the target fusion feature, a reference fusion feature and a reference audio feature.

In embodiments of the present disclosure, the reference fusion feature may be obtained by fusing a reference phoneme feature of a reference text and a reference semantic feature of the reference text.

In embodiments of the present disclosure, the reference text may include one or more reference characters. For example, the reference character may be a character in various languages, such as Chinese character, English character, German character, etc. The language of the reference character may be the same as or different from the language of the target character.

In embodiments of the present disclosure, the reference audio feature may be determined according to a reference audio corresponding to the reference text. For example, if a speech recognition is performed on the reference audio, a recognition result may be consistent with the reference text. It may be understood that the reference text may be acquired in various ways, which is not limited in the present disclosure. For example, it is possible to acquire the reference text and then record a corresponding audio as the reference audio.

In embodiments of the present disclosure, various encoding methods may be used to encode the target fusion feature, the reference fusion feature and the reference audio feature to obtain the encoding feature. For example, various encoding methods may include convolution, attention mechanism encoding, multi head self-attention encoding, etc.

In operation S230, the encoding feature is decoded to obtain a target audio corresponding to the target text.

In embodiments of the present disclosure, the timbre, emotion and other information of the target audio may be consistent with the timbre, emotion and other information of the reference audio, respectively.

Through embodiments of the present disclosure, when generating the target audio corresponding to the target text, not only the target text and the reference audio feature are used, but also relevant information from the reference text is used, which helps to improve a similarity between the reference audio and the target audio. By fusing the phoneme feature and the semantic feature correspondingly before encoding, it is possible to fully utilize the semantic information of the text, and improve a similarity between the non-verbal information of the target audio and the non-verbal information of the reference audio based on the semantic information, so as to obtain a high-quality target audio. Such target audio may be more natural, clear and smooth, may have non-verbal communication information such as laughing, crying, coughing, pauses, etc. that is highly similar to the reference audio, and may be closer to a speech of a real person.

It may be understood that the method of the present disclosure has been described above. A description of the target fusion feature of the present disclosure will be given below.

In some embodiments, the target semantic feature may include at least one target semantic sub-feature, and each target character may correspond to a target semantic sub-feature.

In embodiments of the present disclosure, at least one target semantic sub-feature of the target semantic feature corresponds to at least one target phoneme sub-feature of the target phoneme feature. For example, as described above, the target semantic sub-feature may correspond to a target character. One or more target phoneme sub-features corresponding to the target character may correspond to the target semantic sub-feature.

In embodiments of the present disclosure, the target fusion feature may include at least one target fusion sub-feature. The target fusion sub-feature may be obtained by fusing the target semantic sub-feature and the target phoneme sub-feature corresponding to the target semantic sub-feature. For example, taking a case that the target semantic sub-feature corresponds to one target phoneme sub-feature as an example, the target semantic sub-feature may be fused with the target phoneme sub-feature to obtain the target fusion sub-feature. Through embodiments of the present disclosure, by fusing the target phoneme sub-feature and the target semantic sub-feature correspondingly before encoding, it is possible to more fully utilize the semantic information of the text, and further improve the similarity between the target audio and the reference audio in terms of non-verbal information based on the semantic information, so as to obtain a higher-quality target audio.

It may be understood that the target fusion feature of the present disclosure has been described above. A description of some methods of obtaining the target fusion feature will be given below.

In some embodiments, in some implementations of operation S210 described above, fusing the target phoneme feature of the target text and the target semantic feature of the target text to obtain the target fusion feature includes: determining the target phoneme feature according to the target text; determining the target semantic feature according to the target text; and fusing the target phoneme feature and the target semantic feature to obtain the target fusion feature.

In embodiments of the present disclosure, determining the target phoneme feature according to the target text may include: determining at least one target phoneme corresponding to at least one target character. For example, if the text is "全国一共有一百二十二所高校 (there are a total of 122 colleges and universities in the country)", a phoneme sequence "quan2 g uo2 y i2 g ong4 y ou3 y i4 b ai3 y i1 sh i2 er4 s uo3 g ao1 x iao4" may be determined. A character "全" corresponds to phonemes "q" and "uan2", a character "国" corresponds to phonemes "g" and "uo2", and a number "2" in the phoneme "uan2" may indicate a tone. That is, a character may correspond to one or more phonemes. It may be understood that the text may be used as the target text, and each phoneme in the phoneme sequence may be used as the target phoneme. It may also be understood that for the sake of simplicity, the following description will be given with a target text "全国" as an example.

In embodiments of the present disclosure, determining the target phoneme feature according to the target text may include: performing embedding on at least one target phoneme to obtain at least one target phoneme sub-feature of the target phoneme feature. The at least one target phoneme may be converted into at least one target phoneme identification. Then, embedding may be performed on the at least one target phoneme identification to obtain at least one target phoneme sub-feature. For example, taking the target text "全国" as an example, a target phoneme sequence of the target text may include a plurality of target phonemes. The plurality of target phonemes may include a target phoneme "q", a target phoneme "uan2", a target phoneme "g", and a target phoneme "uo2". The plurality of target phonemes in the target phoneme sequence may be converted into a plurality of target phoneme identifications to obtain a target phoneme identification sequence [1, 2, 3, 4]. The target phoneme "q" may correspond to a target phoneme identification "1", the target phoneme "uan2" may correspond to a target phoneme identification "2", the target phoneme "g" may correspond to a target phoneme identification "3", and the target phoneme "uo2" may correspond to a target phoneme identification "4". Then, embedding may be performed on the target phoneme identification sequence to obtain a target phoneme feature [1_v, 2_v, 3_v, 4_v]. The target phoneme feature may include a target phoneme sub-feature "1_v", a target phoneme sub-feature "2_v", a target phoneme sub-feature "3_v", and a target phoneme sub-feature "4_v". It may be understood that the correspondence between the target phoneme and the target phoneme identification is merely an example. Through embodiments of the present disclosure, by converting the phoneme into a phoneme identification and performing embedding on the phoneme identification, it is possible to accurately determine the phoneme feature, which helps to improve the similarity between the target audio and the reference audio.

It may be understood that some methods of determining the target phoneme feature have described above. A description of some methods of determining the target semantic feature will be given below.

In embodiments of the present disclosure, determining the target semantic feature according to the target text includes: determining at least one target semantic representation corresponding to at least one target character. For example, taking the target text "全国" as an example, a target semantic representation sequence [11,12] may be determined. The target semantic identification sequence may include a target semantic representation "11" corresponding to the character "全" and a target semantic representation "12" corresponding to the character "国". It may be understood that the correspondence between the character and the semantic representation is merely an example.

In embodiments of the present disclosure, determining the target semantic feature according to the target text includes: performing embedding on at least one target semantic representation to obtain at least one target semantic sub-feature of the target semantic feature. For example, embedding may be performed on the target semantic identification sequence [11,12] to obtain a target semantic feature [11_v,12_v]. The target semantic feature [11_v, 12_v] may include a target semantic sub-feature "11_v" and a target semantic sub-feature "12_v". Through embodiments of the present disclosure, by converting the character into a semantic representation and performing embedding on the semantic representation, it is possible to accurately determine the semantic feature and provide an accurate semantic information for the audio generation, so that the similarity between the target audio and the reference audio may be improved.

It may be understood that the method of determining the target semantic feature has been described above. A description of some methods of obtaining the target fusion feature will be given below.

In embodiments of the present disclosure, fusing the target phoneme feature and the target semantic feature to obtain the target fusion feature includes: fusing the target semantic sub-feature with at least one target phoneme sub-feature corresponding to the target semantic sub-feature to obtain at least one target fusion sub-feature. If the target semantic sub-feature corresponds to a plurality of target phoneme sub-features, the plurality of target phoneme sub-features corresponding to the target semantic sub-feature may be fused with the target semantic sub-feature to obtain a plurality of target fusion sub-features. A description will be given below with reference to FIG. 3.

Figure 3:
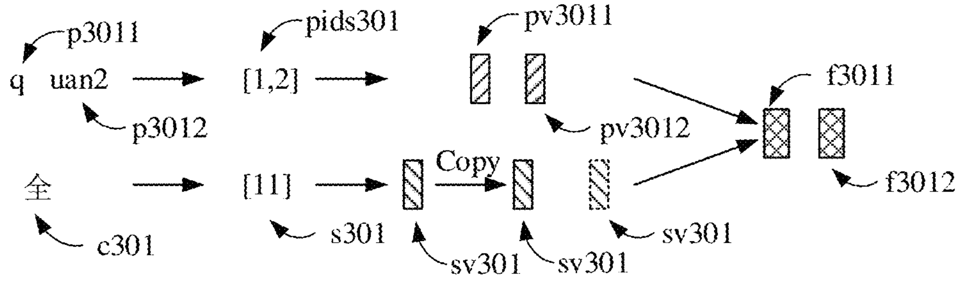
FIG. 3 shows a schematic diagram of obtaining a target fusion sub-feature according to an embodiment of the present disclosure.

FIG. 3 shows a schematic diagram of obtaining a target fusion sub-feature according to an embodiment of the present disclosure.

As shown in FIG. 3, a target character c301 may be the target character "'全". The target character c301 may correspond to a target phoneme p3011 and a target phoneme p3012. The target phoneme p3011 may be the target phoneme "q", and the target phoneme p3012 may be the target phoneme "uan2".

The target phoneme p3011 and the target phoneme p3012 may be used as a target phoneme sub-sequence of the target phoneme sequence described above. After the target phoneme identification sequence of the target phoneme sequence is determined, a target phoneme identification sub-sequence pids301 may be obtained. The target phoneme identification sub-sequence pids301 may include a target phoneme identification "1"" and a target phoneme identification "2". Embedding may be performed on the target phoneme identification sub-sequence pids301 to obtain a target phoneme sub-feature pv3011 and a target phoneme sub-feature pv3012.

A target semantic representation s301 of the target character c301 may be determined. The target semantic representation s301 may be a target semantic representation "11". Embedding may be performed on the target semantic representation s301 to obtain a target semantic sub-feature sv301. Therefore, the target character c301 may correspond to the target semantic sub-feature sv301, and/or correspond to two target phoneme sub-features.

Next, the target semantic sub-feature sv301 may be copied to obtain a plurality of target semantic sub-features sv301. The target phoneme sub-feature pv3011 may be fused with the target semantic sub-feature sv301 to obtain a target fusion sub-feature f3011. The target phoneme sub-feature pv3012 may be fused with the target semantic sub-feature sv301 to obtain a target fusion sub-feature f3012. Through embodiments of the present disclosure, by fusing the semantic sub-feature with one or more corresponding phoneme sub-features, it is possible to fully utilize the semantic information and the phoneme information of the target text and accurately generate the target audio in the audio generation.

It may be understood that some methods of obtaining the target fusion feature have been described above. A further description of the reference fusion feature may be given below.

In embodiments of the present disclosure, the reference phoneme feature may include at least one reference phoneme sub-feature, and each reference character may correspond to one or more reference phoneme sub-features.

In embodiments of the present disclosure, the reference semantic feature may include at least one reference semantic sub-feature, and each reference character may correspond to a reference semantic sub-feature.

In embodiments of the present disclosure, at least one reference semantic sub-feature of the reference semantic feature corresponds to at least one reference phoneme sub-feature of the reference phoneme feature. For example, as described above, the reference semantic sub-feature may correspond to a reference character. One or more reference phoneme sub-features corresponding to the reference character may correspond to the reference semantic sub-feature.

In embodiments of the present disclosure, the reference fusion feature may include at least one reference fusion sub-feature. The reference fusion sub-feature may be obtained by fusing a reference semantic sub-feature with a reference phoneme sub-feature corresponding to the reference semantic sub-feature. For example, taking a case that the reference semantic sub-feature corresponds to one reference phoneme sub-feature as an example, the reference semantic sub-feature may be fused with the reference phoneme sub-feature to obtain a reference fusion sub-feature. Through embodiments of the present disclosure, not only the reference text corresponding to the reference audio is used, but also the reference phoneme sub-feature and the reference semantic sub-feature are fused correspondingly before encoding, so that the semantic information and the phoneme information of the reference text may be more fully utilized, and the similarity between the target audio and the reference audio in terms of non-verbal information may be further improved.

It may be understood that the reference fusion feature of the present disclosure has been described above. A description of some methods of obtaining the reference fusion feature will be given below.

In some embodiments, in some implementations of operation S220 described above, the reference fusion feature is obtained by fusing the reference phoneme feature of the reference text and the reference semantic feature of the reference text through the following operations. The reference phoneme feature is determined according to the reference text; the reference semantic feature is determined according to the reference text; and the reference phoneme feature and the reference semantic feature are fused to obtain the reference fusion feature.

In embodiments of the present disclosure, determining the reference phoneme feature according to the reference text includes: determining at least one reference phoneme corresponding to at least one reference character. Taking the reference text being “本省” as an example, a reference phoneme sequence “b en3 sh eng3” may be determined. A reference character “本” may correspond to a reference phoneme “b” and a reference phoneme “en3”. A reference character “省” may correspond to a reference phoneme “sh” and a reference phoneme “eng3”.

In embodiments of the present disclosure, determining the reference phoneme feature according to the reference text includes: performing embedding on at least one reference phoneme to obtain at least one reference phoneme sub-feature of the reference phoneme feature. The at least one reference phoneme may be converted into at least one reference phoneme identification. Then, embedding may be performed on the at least one reference phoneme identification to obtain at least one reference phoneme sub-feature. For example, taking the reference text “本省” as an example, the reference phoneme sequence of the reference text may include a plurality of reference phonemes. The plurality of reference phonemes in the reference phoneme sequence may be converted into a plurality of reference phoneme identifications to obtain a reference phoneme identification sequence [5, 6, 7, 8]. The reference phoneme “b” may correspond to a reference phoneme identification “5”, the reference phoneme “en3” may correspond to a reference phoneme identification “6”, the reference phoneme “sh” may correspond to a reference phoneme identification “7”, and the reference phoneme “eng3” may correspond to a reference phoneme identification “8”. Then, embedding may be performed on the reference phoneme identification sequence to obtain a reference phoneme feature [5_v, 6_v, 7_v, 8_v]. The reference phoneme feature may include a reference phoneme sub-feature ‘5_v’, a reference phoneme sub-feature ‘6_v’, a reference phoneme sub-feature ‘7_v’, and a reference phoneme sub-feature ‘8_v’. It may be understood that the correspondence between the reference phoneme and the reference phoneme identification is merely an example. Through embodiments of the present disclosure, the correspondence between the character and the phoneme identification for the reference text may be consistent with the correspondence between the character and the phoneme identification for the target text. In the embedding process, it is possible to use the same embedding table to accurately extract the phoneme feature of the reference text and the phoneme feature of the target text, which helps to fully utilize the phoneme information of the reference text and the phoneme information of the target text, so that the similarity between the target audio and the reference audio may be improved.

It may be understood that some methods of determining the reference phoneme feature have been described above. A description of some methods of determining the reference semantic feature will be given below.

In embodiments of the present disclosure, determining the reference semantic feature according to the reference text may include: determining at least one reference semantic representation corresponding to at least one reference character. For example, taking the reference text “本省” as an example, a reference semantic representation sequence [17, 18] may be determined. The reference semantic identification sequence may include a reference semantic representation “17” corresponding to the character “'本” and a reference semantic representation “18” corresponding to the character “省”.

In embodiments of the present disclosure, determining the reference semantic feature according to the reference text may include: performing embedding on at least one reference semantic representation to obtain at least one reference semantic sub-feature of the reference semantic feature. For example, embedding may be performed on the reference semantic identification sequence [17,18] to obtain a reference semantic feature [17_v,18_v]. The reference semantic feature [17_v, 18_v] may include a reference semantic sub-feature “17_v”” and a reference semantic sub-feature “18_v”. Through embodiments of the present disclosure, the correspondence between the character and the semantic identification for the reference text may be consistent with the correspondence between the character and the semantic identification for the target text. In the embedding process, it is possible to use the same embedding table to accurately extract the semantic feature of the reference text and the semantic feature of the target text, so that the target audio may be more similar to the reference audio in terms of non-verbal communication information such as timbre, emotion, etc., and the similarity between the target audio and the reference audio may be further improved.

It may be understood that the method of determining the reference semantic feature has been described above. A description of some methods of determining the reference fusion feature may be given below.

In embodiments of the present disclosure, fusing the reference phoneme feature and the reference semantic feature to obtain the reference fusion feature includes: fusing the reference semantic sub-feature with at least one reference phoneme sub-feature corresponding to the reference semantic sub-feature to obtain at least one reference fusion sub-feature. If the reference semantic sub-feature corresponds to a plurality of target phoneme sub-features, the plurality of reference phoneme sub-features corresponding to the reference semantic sub-feature may be fused with the reference semantic sub-feature to obtain a plurality of reference fusion sub-features. For example, the reference character “本” may correspond to a reference semantic sub-feature “17_v”, and may also correspond to a reference phoneme sub-feature “5_v” and a reference phoneme sub-feature “6_v”. Then, the reference semantic sub-feature “17_v” may be copied to obtain a plurality of reference semantic sub-features “17_v”. The reference phoneme sub-feature “5_v” may be fused with the reference semantic sub-feature “17 v” to obtain a reference fusion sub-feature. The reference phoneme sub-feature “6_v” may be fused with the reference semantic sub-feature “17_v” to obtain another reference fusion sub-feature. Through embodiments of the present disclosure, the semantic information and the phoneme information of the reference text may be fully utilized to improve a generation efficiency and an accuracy of the target audio.

It may be understood that some methods of obtaining the reference fusion feature have been described above. A further description of the reference audio feature will be given below.

In some embodiments, the reference audio feature is determined according to the reference audio corresponding to the reference text through the following operations. The reference audio is encoded to obtain a plurality of reference audio semantic representations that are discretized; and embedding is performed on the plurality of reference audio semantic representations to obtain the reference audio feature. A description will be given below with reference to FIG. 4.

Figure 4:
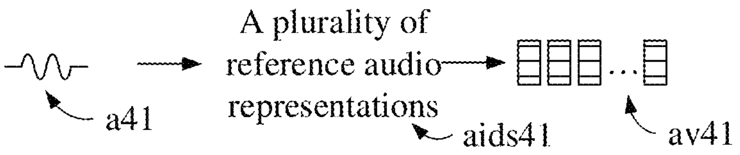
FIG. 4 shows a schematic diagram of obtaining a reference audio feature according to an embodiment of the present disclosure.

FIG. 4 shows a schematic diagram of obtaining a reference audio feature according to an embodiment of the present disclosure.

As shown in FIG. 4, a reference audio a41 may be encoded to obtain a plurality of reference audio representations aids41 that are discretized. The audio representation may be a number string. As described above, the reference audio may correspond to the reference text. A duration of the reference audio may be related to, for example, a speed of reading the reference text. In an embodiment, the plurality of reference audio representations aids41 of the reference audio may include [5, 6, 7, 8]. In another embodiment, the plurality of reference audio representations of the reference audio may also include other character strings. One or more of the plurality of reference audio representations are related to the timbre, emotion, etc. of the audio.

Embedding may be performed on the plurality of reference audio representations aids41 to obtain a reference audio feature av41. The reference audio feature may include a plurality of reference audio sub-features corresponding to the plurality of reference audio representations.

It may be understood that the reference audio feature of the present disclosure has been described above. A description of some methods of obtaining the encoding feature of the present disclosure will be given below.

In some embodiments, in some implementations of operation S220 described above, obtaining the encoding feature according to the target fusion feature, the reference fusion feature and the reference audio feature includes: fusing the target fusion feature, the reference fusion feature and the reference audio feature to obtain a feature to be processed; and encoding the feature to be processed to obtain the encoding feature. A description will be given below with reference to FIG. 5.

Figure 5:
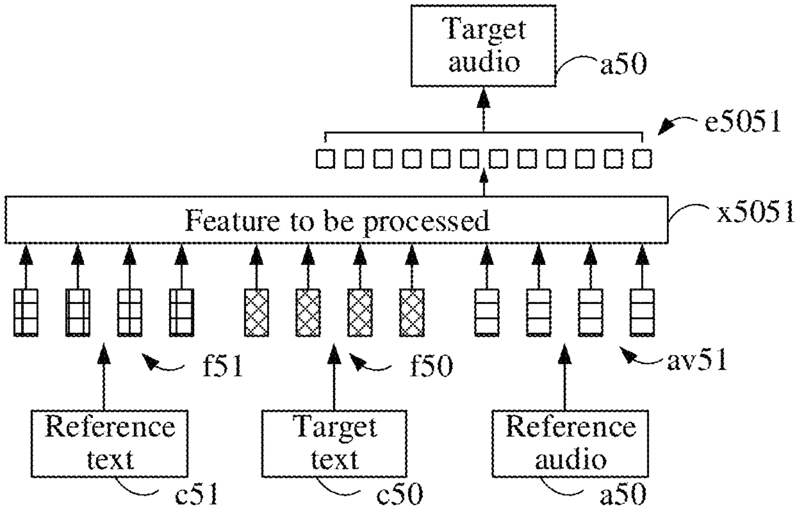
FIG. 5 shows a schematic diagram of an audio generation method according to an embodiment of the present disclosure.

FIG. 5 shows a schematic diagram of an audio generation method according to an embodiment of the present disclosure.

As shown in FIG. 5, a reference fusion feature f51 may be obtained according to a reference text c51, a target fusion feature f50 may be obtained according to a target text c50, and a reference audio feature av51 may be obtained according to the reference audio a51. It may be understood that the methods of obtaining the reference fusion feature f51, the target fusion feature f50 and the reference audio feature av51 are the same as or similar to the above-mentioned methods of obtaining the reference fusion feature, the target fusion feature and the reference audio feature, which will not be repeated here.

The reference fusion feature f51, the target fusion feature f50 and the reference audio feature av51 may be fused to obtain a feature x5051 to be processed. The feature x5051 to be processed may be encoded to obtain an encoding feature e5051. The encoding method may be performing multi-head self-attention encoding at least once.

It may be understood that some methods of obtaining the encoding feature in the present disclosure have been described above. A description of some methods of obtaining the target audio in the present disclosure will be given below.

In some embodiments, in some implementations of operation S230 described above, decoding the encoding feature to obtain the target audio corresponding to the target text includes: decoding the encoding feature according to a decoding method corresponding to the encoding method of the reference audio to obtain the target audio. If the encoding method used to obtain the plurality of reference audio representations aids41 is used as the audio encoding method, as shown in FIG. 5, the encoding feature e5051 may be decoded according to an audio decoding method corresponding to the audio encoding method to obtain a target audio a50.

It may be understood that the audio generation method of the present disclosure has been described above. In some embodiments, the audio generation method may be implemented based on an audio generation model. A method of training the audio generation model will be described below.

Figure 6:
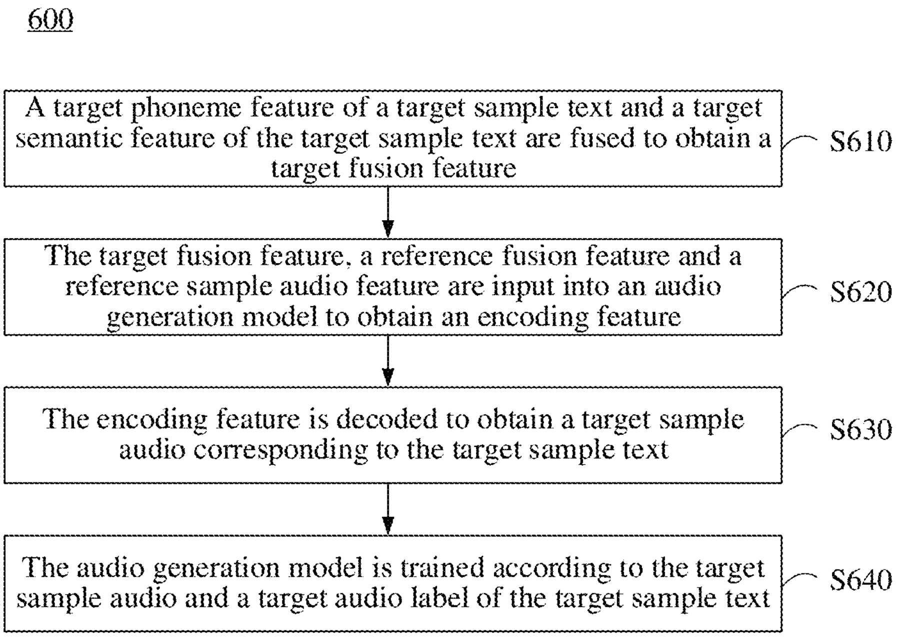
FIG. 6 shows a schematic flowchart of a method of training an audio generation model according to other embodiments of the present disclosure.

FIG. 6 shows a schematic flowchart of a method of training an audio generation model according to other embodiments of the present disclosure.

As shown in FIG. 6, a method 600 may include operation S610 to operation S640.

In operation S610, a target phoneme feature of a target sample text and a target semantic feature of the target sample text are fused to obtain a target fusion feature.

In operation S620, the target fusion feature, a reference fusion feature and a reference sample audio feature are input into an audio generation model to obtain an encoding feature.

In embodiments of the present disclosure, the reference fusion feature is obtained by fusing a reference phoneme feature of the reference sample text and a reference semantic feature of the reference sample text.

In embodiments of the present disclosure, the reference audio feature is determined according to a reference sample audio corresponding to the reference sample text.

In operation S630, the encoding feature is decoded to obtain a target sample audio corresponding to the target sample text.

It may be understood that the description of operation S610 to operation S630 is the same as or similar to the above description of operation S210 to operation S230, which will not be repeated here.

In operation S640, the audio generation model is trained according to the target sample audio and a target audio label of the target sample text.

In embodiments of the present disclosure, the target audio label may be an audio corresponding to the target sample text. It is possible to adjust a parameter of the audio generation model according to a difference between the target sample audio and the target audio label, so as to train the audio generation model.

Through embodiments of the present disclosure, the model may be efficiently trained in a case of zero-shot or few-shot to generate high-quality audio.

It may be understood that the method of training the audio generation model in the present disclosure has been described above. A description will be given below for the target fusion feature of the target sample text and the reference fusion feature of the reference sample text.

In embodiments of the present disclosure, at least one target semantic sub-feature of the target semantic feature corresponds to at least one target phoneme sub-feature of the target phoneme feature.

In embodiments of the present disclosure, the target fusion feature includes at least one target fusion sub-feature, and the target fusion sub-feature is obtained by fusing a target semantic sub-feature and a target phoneme sub-feature corresponding to the target semantic sub-feature.

In embodiments of the present disclosure, at least one reference semantic sub-feature of the reference semantic feature corresponds to at least one reference phoneme sub-feature of the reference audio feature.

In embodiments of the present disclosure, the reference fusion feature includes at least one reference fusion sub-feature, and the reference fusion sub-feature is obtained by fusing a reference semantic sub-feature and a reference phoneme sub-feature corresponding to the reference semantic sub-feature. It may be understood that the above description of the target fusion feature of the target text and the reference fusion feature of the reference text is also applicable to the target fusion feature of the target sample text and the reference fusion feature of the reference sample text, which will not be repeated here.

It may be understood that the target fusion feature of the target sample text and the reference fusion feature of the reference sample text have been described above. A further description of the audio generation model of the present disclosure will be further given below with reference to FIG. 7.

Figure 7:
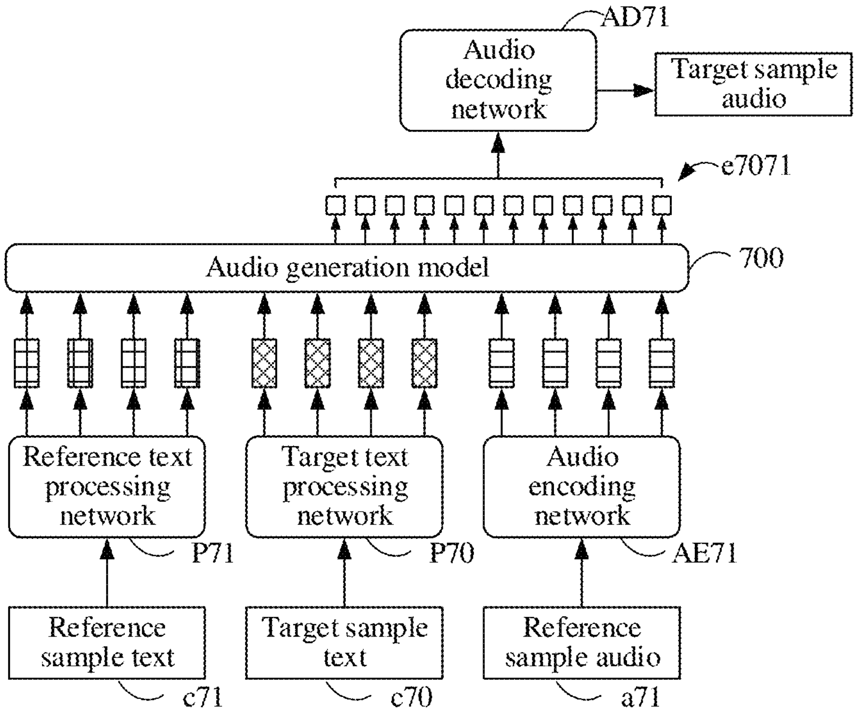
FIG. 7 shows a schematic diagram of an audio generation model according to an embodiment of the present disclosure.

FIG. 7 shows a schematic diagram of an audio generation model according to an embodiment of the present disclosure.

In some embodiments, fusing the target phoneme feature of the target sample text and the target semantic feature of the target sample text to obtain the target fusion feature includes: determining the target phoneme feature according to the target sample text; determining the target semantic feature according to the target sample text; and fusing the target phoneme feature and the target semantic feature to obtain the target fusion feature. As shown in FIG. 7, a target sample text c70 may be input into a target text processing network to obtain the target fusion feature.

In embodiments of the present disclosure, the target sample text includes at least one target sample character. Determining the target phoneme feature according to the target sample text includes: determining at least one target phoneme corresponding to the at least one target sample character; and performing embedding on the at least one target phoneme to obtain at least one target phoneme sub-feature of the target phoneme feature. A target text processing network P70 may include a target phoneme conversion layer. The target sample text c70 may be input into the target phoneme conversion layer to obtain a target phoneme sequence. The target phoneme sequence may include at least one target phoneme. For another example, the target phoneme sequence may be obtained by Equation (1) as follows.

target_phone_ids = get_phones_to_sequence(TargetTextPrompt) (1)

where target_phone_ids may represent a target phoneme sequence, get_phones_to_sequence( ) may correspond to a target phoneme conversion layer, and TargetTextPrompt may represent a target sample text.

The target text processing network P70 may further include a target embedding layer. The target phoneme sequence may be input into the target embedding layer to obtain the target phoneme feature. It may be understood that the above description of obtaining the target phoneme feature of the target text is also applicable to obtaining the target phoneme feature of the target sample text using the target text processing network P70, and details will not be repeated here.

In some embodiments, determining the target semantic feature according to the target sample text includes: determining at least one target semantic representation corresponding to at least one target character; performing embedding on the at least one target semantic representation to obtain at least one target semantic sub-feature of the target semantic feature. The target sample text may be processed using a bidirectional encoder representation from transformer model to obtain a target semantic representation sequence. The target semantic representation sequence may include at least one target semantic representation. For another example, the target semantic representation sequence may be obtained using Equation (2).

target_bert_ids = bert_tokenizer(TargetTextPrompt) (2)

where target_bert_ids may represent a target semantic representation sequence, and bert_tokenizer( ) corresponds to a bidirectional encoder representation from transformer model.

Next, embedding may be performed on the target semantic representation sequence to obtain a target semantic feature. It may be understood that the above description of obtaining the target semantic feature of the target text is also applicable to obtaining the target semantic feature of the target sample text using the target text processing network P70, and details will not be repeated here.

In embodiments of the present disclosure, fusing the target phoneme feature and the target semantic feature to obtain the target fusion feature includes: fusing the target semantic sub-feature with at least one target phoneme sub-feature corresponding to the target semantic sub-feature to obtain at least one target fusion sub-feature. If the target semantic sub-feature corresponds to a plurality of target phoneme sub-features, the plurality of target phoneme sub-features corresponding to the target semantic sub-feature may be fused with the target semantic sub-feature to obtain a plurality of target fusion sub-features. It may be understood that the method of obtaining the target fusion feature of the target sample text is the same as or similar to the above-mentioned method of obtaining the target fusion feature of the target text, which will not be repeated here.

In some embodiments, the reference fusion feature is obtained by fusing the reference phoneme feature of the reference sample text and the reference semantic feature of the reference sample text through the following operations. The reference phoneme feature is determined according to the reference sample text; the reference semantic feature is determined according to the reference sample text; and the reference phoneme feature and the reference semantic feature are fused to obtain the reference fusion feature. As shown in FIG. 7, a reference sample text c71 may be input into the reference text processing network P71 to obtain a reference fusion feature.

In embodiments of the present disclosure, the reference sample text includes at least one reference sample character. Determining the reference phoneme feature according to the reference sample text includes: determining at least one reference phoneme corresponding to the at least one reference sample character; performing embedding on the at least one reference phoneme to obtain at least one reference phoneme sub-feature of the reference phoneme feature. The reference text processing network P71 may include a reference phoneme conversion layer. The reference sample text c71 may be input into the reference phoneme conversion layer to obtain a reference phoneme sequence. The reference phoneme sequence may include at least one reference phoneme. For another example, the reference phoneme sequence may be obtained by Equation (3) as follows.

$$\text{reference\_phone\_ids} = \text{get\_phones\_to\_sequence(ReferenceTextPrompt)} \quad (3)$$

where reference_phone_ids may represent a reference phoneme sequence, get_phones_to_sequence( ) may correspond to a reference phoneme conversion layer, and ReferenceTextPrompt may represent a reference sample text.

The reference text processing network P71 may further include a reference embedding layer. The reference phoneme sequence may be input into the reference embedding layer to obtain a reference phoneme feature. It may be understood that the above description of obtaining the reference phoneme feature of the reference text is also applicable to obtaining the reference phoneme feature of the reference sample text using the reference text processing network P71, and details will not be repeated here.

In some embodiments, determining the reference semantic feature according to the reference sample text includes: determining at least one reference semantic representation corresponding to at least one reference sample character; performing embedding on at least one target semantic representation to obtain at least one reference semantic sub-feature of the reference semantic feature. The reference sample text may be processed using a bidirectional encoder representation from transformer model to obtain a reference semantic representation sequence. The reference semantic representation sequence may include at least one reference semantic representation. For another example, the reference semantic representation sequence may be obtained using Equation (4) as follows.

$$\text{reference\_bert\_ids} = \text{bert\_tokenizer(ReferenceTextPrompt)} \quad (4)$$

where reference_bert_ids may represent a reference semantic representation sequence, and bert_tokenizer( ) corresponds to a bidirectional encoder representation from transformer model.

Next, embedding may be performed on the reference semantic representation sequence to obtain a reference semantic feature. It may be understood that the above description of obtaining the reference semantic feature of the reference text is also applicable to obtaining the reference semantic feature of the reference sample text using the reference text processing network P71, and details will not be repeated here.

In some embodiments, the reference semantic sub-feature corresponds to a plurality of reference phoneme sub-features. Fusing the reference phoneme feature and the reference semantic feature to obtain the reference fusion feature includes: fusing the reference semantic sub-feature with at least one reference phoneme sub-feature corresponding to the reference semantic sub-feature to obtain at least one reference fusion sub-feature. If the reference semantic sub-feature corresponds to a plurality of reference phoneme sub-features, the plurality of reference phoneme sub-features corresponding to the reference semantic sub-feature may be fused with the reference semantic sub-feature to obtain a plurality of reference fusion sub-features. It may be understood that the method of obtaining the reference fusion feature of the reference sample text is the same as or similar to the above-mentioned method of obtaining the reference fusion feature of the reference text, which will not be repeated here.

It may be understood that the method of obtaining the reference fusion feature of the reference sample text has been described above. A description of some methods of obtaining the reference sample audio feature will be given below.

In some embodiments, the reference sample audio feature is determined according to the reference sample audio corresponding to the reference sample text through the following operations. The reference sample audio is input into an audio encoding network to obtain a plurality of reference sample audio representations that are discretized; embedding is performed on the plurality of reference sample audio semantic representations to obtain a reference sample audio feature. As shown in FIG. 7, a reference sample audio a71 may be input into an audio encoding network AE71 to obtain a reference sample audio representation sequence. The reference sample audio representation sequence may include a plurality of reference sample audio representations. It may be understood that the above description of the reference audio representation is also applicable to the reference sample audio representation, and details will not be repeated here. For another example, the reference sample audio representation sequence may be obtained by Equation (5) as follows.

$$\text{acoustic\_ids} = \text{AcousticEncoder(AcousticPrompt)} \quad (5)$$

where acoustic_ids may represent a reference sample audio representation sequence, AcousticEncoder( ) may correspond to an audio encoding network, and AcousticPrompt represents a reference sample audio.

Next, embedding may be performed on the reference sample audio representation sequence to obtain a reference sample audio feature.

It may be understood that the reference sample audio feature has been described above. A description of some methods of obtaining an encoding feature will be given below.

In some embodiments, inputting the target fusion feature, the reference fusion feature and the reference sample audio feature into the audio generation model to obtain the encoding feature includes: fusing the target fusion feature, the reference fusion feature and the reference sample audio feature to obtain a feature to be processed; and inputting the feature to be processed into the audio generation model to obtain the encoding feature. The feature to be processed may be obtained by Equation (6) as follows.

$$\text{x\_input} = \text{make\_input\_data(target\_vec, reference\_vec, acoustic\_vec)} \quad (6)$$

where x_input may represent a feature to be processed, and make_input_data( ) may represent an input preprocessing function. If the fusion method for obtaining the above-mentioned fusion sub-feature is addition, then the fusion feature is consistent with the phoneme feature or the semantic feature in terms of dimension, and a concatenation result of the target fusion feature, the reference fusion feature and the reference sample audio feature may be used directly as the feature to be processed. If the fusion method for obtaining the above-mentioned fusion sub-feature is concatenation, then the fusion feature is different from the phoneme feature or the semantic feature in terms of dimension, and it is possible to adjust the dimension of the concatenation result of the target fusion feature, the reference fusion feature and the reference sample audio feature to obtain the feature to be processed. target_vec may represent a target fusion feature, reference_vec may represent a reference fusion feature, and acoustic_vec may represent a reference sample audio feature.

In embodiments of the present disclosure, the audio generation model is a large audio generation model. For example, the large audio generation model may be a large model ERNIE. As shown in FIG. 7, the feature to be processed may be input into the audio generation model M700 to obtain an encoding feature e7071.

It may be understood that some methods of obtaining the encoding feature have been described above. A description of some methods of obtaining the target sample audio will be given below.

In some embodiments, decoding the encoding feature to obtain the target sample audio corresponding to the target sample text includes: inputting the encoding feature into an audio decoding network to obtain a target sample audio. As shown in FIG. 7, an encoding feature e7071 may be input into an audio decoding network AD71 to obtain a target sample audio a70. The audio decoding network AD71 may correspond to the audio encoding network, for example, the audio encoding network and the audio decoding network may be a sound stream encoder and a sound stream decoder, respectively.

In some embodiments, training the audio generation model includes: only training the audio generation model among the audio encoding network, the audio decoding network and the audio generation model. Through embodiments of the present disclosure, the audio encoding network and the audio decoding network may be networks that are not fine-tuned, and in the training process, only the audio generation model is trained, so that the large audio generation model has the ability to complete timbre, and the similarity between the target sample audio and the reference sample audio in terms of timbre, emotion and other information may be improved.

It may be understood that the methods of the present disclosure have been described above. A description of apparatuses of the present disclosure will be given below.

Figure 8:
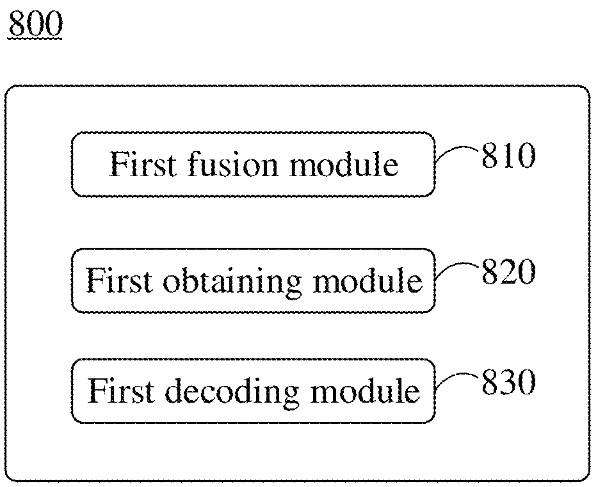
FIG. 8 shows a block diagram of an audio generation apparatus according to an embodiment of the present disclosure.

FIG. 8 shows a block diagram of an audio generation apparatus according to an embodiment of the present disclosure.

As shown in FIG. 8, an apparatus 800 may include a first fusion module 810, a first obtaining module 820, and a first decoding module 830.

The first fusion module 810 may be used to fuse a target phoneme feature of a target text and a target semantic feature of the target text to obtain a target fusion feature.

In embodiments of the present disclosure, at least one target semantic sub-feature of the target semantic feature corresponds to at least one target phoneme sub-feature of the target phoneme feature, and the target fusion feature includes at least one target fusion sub-feature obtained by fusing the target semantic sub-feature and the target phoneme sub-feature corresponding to the target semantic sub-feature.

The first obtaining module 820 may be used to obtain an encoding feature according to the target fusion feature, a reference fusion feature and a reference audio feature. The reference fusion feature is obtained by fusing a reference phoneme feature of a reference text and a reference semantic feature of the reference text, at least one reference semantic sub-feature of the reference semantic feature corresponds to at least one reference phoneme sub-feature of the reference phoneme feature, the reference fusion feature includes at least one reference fusion sub-feature, and the reference audio feature is determined according to a reference audio corresponding to the reference text.

The first decoding module 830 may be used to decode the encoding feature to obtain a target audio corresponding to the target text.

In some embodiments, the first fusion module includes: a first determination sub-module used to determine the target phoneme feature according to the target text; a second determination sub-module used to determine the target semantic feature according to the target text; and a first fusion sub-module used to fuse the target phoneme feature and the target semantic feature to obtain the target fusion feature.

In some embodiments, the target text includes at least one target character, and the first determination sub-module includes: a first determination unit used to determine at least one target phoneme corresponding to the at least one target character; and a first embedding unit used to perform embedding on the at least one target phoneme to obtain at least one target phoneme sub-feature of the target phoneme feature.

In some embodiments, the second determination sub-module includes: a second determination unit used to determine at least one target semantic representation corresponding to the at least one target character; and a second embedding unit used to perform embedding on the at least one target semantic representation to obtain at least one target semantic sub-feature of the target semantic feature.

In some embodiments, the target semantic sub-feature corresponds to a plurality of target phoneme sub-features, and the first fusion sub-module may be further used to fuse the plurality of target phoneme sub-features corresponding to the target semantic sub-feature with the target semantic sub-feature respectively to obtain a plurality of target fusion sub-features.

In some embodiments, the reference fusion feature is obtained by fusing the reference phoneme feature of the reference text and the reference semantic feature of the reference text through the following sub-modules: a third determination sub-module used to determine the reference phoneme feature according to the reference text; a fourth determination sub-module used to determine the reference semantic feature according to the reference text; and a second fusion sub-module used to fuse the reference phoneme feature and the reference semantic feature to obtain the reference fusion feature.

In some embodiments, the reference text includes at least one reference character, and the third determination sub-module includes: a third determination unit used to determine at least one reference phoneme corresponding to the at least one reference character; and a third embedding unit used to perform embedding on the at least one reference phoneme to obtain at least one reference phoneme sub-feature of the reference phoneme feature.

In some embodiments, the fourth determination sub-module includes: a fourth determination unit used to determine at least one reference semantic representation corresponding to the at least one reference character; and a fourth embedding unit used to perform embedding on the at least one reference semantic representation to obtain at least one reference semantic sub-feature of the reference semantic feature.

In some embodiments, the reference semantic sub-feature corresponds to a plurality of reference phoneme sub-features, and the second fusion sub-module may be further used to: fuse the plurality of reference phoneme sub-features corresponding to the reference semantic sub-feature with the reference semantic sub-feature respectively to obtain a plurality of reference fusion sub-features.

In some embodiments, the reference audio feature is determined according to the reference audio corresponding to the reference text through the following sub-modules: a first encoding sub-module used to encode the reference audio to obtain a plurality of reference audio representations, where the plurality of reference audio representations are discretized; and a first embedding sub-module used to perform embedding on the plurality of reference audio representations to obtain the reference audio feature.

In some embodiments, the first obtaining module includes: a third fusion sub-module used to fuse the target fusion feature, the reference fusion feature and the reference audio feature to obtain a feature to be processed; and a second encoding sub-module used to encode the feature to be processed to obtain the encoding feature.

Figure 9:
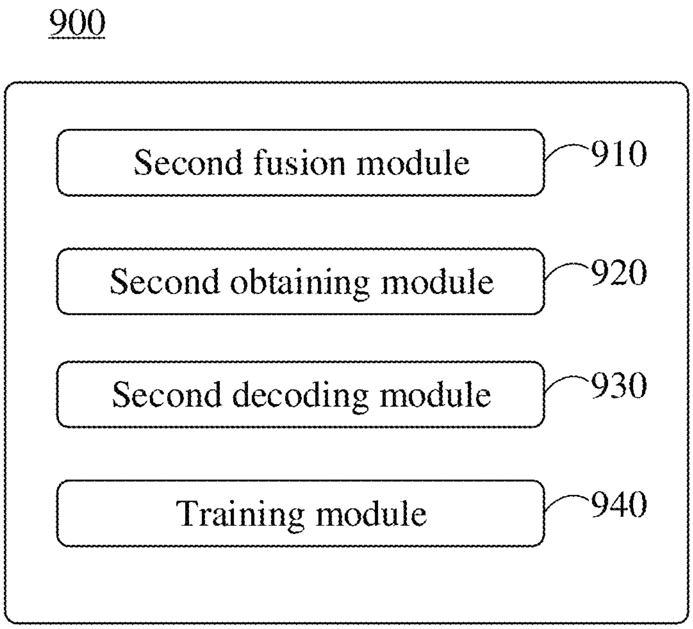
FIG. 9 shows a block diagram of an apparatus of training an audio generation model according to an embodiment of the present disclosure.

FIG. 9 shows a block diagram of an apparatus of training an audio generation model according to an embodiment of the present disclosure.

As shown in FIG. 9, an apparatus 900 may include a second fusion module 910, a second obtaining module 920, a second decoding module 930, and a training module 940.

The second fusion module 910 may be used to fuse a target phoneme feature of a target sample text and a target semantic feature of the target sample text to obtain a target fusion feature.

In embodiments of the present disclosure, at least one target semantic sub-feature of the target semantic feature corresponds to at least one target phoneme sub-feature of the target phoneme feature, and the target fusion feature includes at least one target fusion sub-feature obtained by fusing the target semantic sub-feature and the target phoneme sub-feature corresponding to the target semantic sub-feature.

The second obtaining module 920 may be used to input the target fusion feature, a reference fusion feature and a reference sample audio feature into the audio generation model to obtain an encoding feature.

In embodiments of the present disclosure, the reference fusion feature is obtained by fusing a reference phoneme feature of a reference sample text and a reference semantic feature of the reference sample text, at least one reference semantic sub-feature of the reference semantic feature corresponds to at least one reference phoneme sub-feature of the reference phoneme feature, and the reference fusion feature includes at least one reference fusion sub-feature obtained by fusing the reference semantic sub-feature with the reference phoneme sub-feature corresponding to the reference semantic sub-feature.

In embodiments of the present disclosure, the reference audio feature is determined according to the reference sample audio corresponding to the reference sample text.

The second decoding module 930 may be used to decode the encoding feature to obtain a target sample audio corresponding to the target sample text.

The training module 940 may be used to train the audio generation model according to the target sample audio and a target audio label of the target sample text.

In some embodiments, the audio generation model is a large audio generation model.

In some embodiments, the second fusion module includes: a fifth determination sub-module used to determine the target phoneme feature according to the target sample text; a sixth determination sub-module used to determine the target semantic feature according to the target sample text; and a fourth fusion sub-module used to fuse the target phoneme feature and the target semantic feature to obtain the target fusion feature.

In some embodiments, the target sample text includes at least one target sample character, and the fifth determination sub-module includes: a fifth determination unit used to determine at least one target phoneme corresponding to the at least one target sample character; and a fifth embedding unit used to perform embedding on the at least one target phoneme to obtain at least one target phoneme sub-feature of the target phoneme feature.

In some embodiments, the sixth determination sub-module includes: a sixth determination unit used to determine at least one target semantic representation corresponding to at least one target character; and a sixth embedding unit used to perform embedding on the at least one target semantic representation to obtain at least one target semantic sub-feature of the target semantic feature.

In some embodiments, the target semantic sub-feature corresponds to a plurality of target phoneme sub-features, and the fourth fusion sub-module may be further used to: fuse the plurality of target phoneme sub-features corresponding to the target semantic sub-feature with the target semantic sub-feature respectively to obtain a plurality of target fusion sub-features.

In some embodiments, the reference fusion feature is obtained by fusing the reference phoneme feature of the reference sample text and the reference semantic feature of the reference sample text through the following sub-modules: a seventh determination sub-module used to determine the reference phoneme feature according to the reference sample text; an eighth determination sub-module used to determine the reference semantic feature according to the reference sample text; and a fifth fusion sub-module used to fuse the reference phoneme feature and the reference semantic feature to obtain the reference fusion feature.

In some embodiments, the reference sample text includes at least one reference sample character, and the seventh determination sub-module includes: a seventh determination unit used to determine at least one reference phoneme corresponding to the at least one reference sample character; and a seventh embedding unit used to perform embedding on the at least one reference phoneme to obtain at least one reference phoneme sub-feature of the reference phoneme feature.

In some embodiments, determining the reference semantic feature according to the reference sample text includes: an eighth determine unit used to determine at least one reference semantic representation corresponding to at least reference sample character; and an eighth embedding unit used to perform embedding on the at least reference semantic representation to obtain at least reference semantic sub-feature of the reference semantic feature.

In some embodiments, the reference semantic sub-feature corresponds to a plurality of reference phoneme sub-features, and the fifth fusion sub-module may be further used to: fuse the plurality of the reference phoneme sub-features corresponding to the reference semantic sub-feature with the reference semantic sub-feature respectively to obtain a plurality of reference fusion sub-features.

In some embodiments, the reference sample audio feature is determined according to the reference sample audio corresponding to the reference sample text through the following sub-modules: a first obtaining sub-module used to input the reference sample audio into an audio encoding network to obtain a plurality of reference sample audio semantic representations, where the plurality of reference sample audio semantic representations are discretized; and a second embedding sub-module used to perform embedding on the plurality of reference sample audio semantic representations to obtain the reference sample audio feature.

In some embodiments, the second obtaining module includes: a sixth fusion sub-module used to fuse the target fusion feature, the reference fusion feature and the reference sample audio feature to obtain a feature to be processed; and a second obtaining sub-module used to input the feature to be processed into the audio generation model to obtain the encoding feature.

In some embodiments, the second decoding module may be further used to: input the encoding feature into an audio decoding network to obtain the target sample audio.

In some embodiments, the training module may be further used to: train the audio generation model only among the audio encoding network, the audio decoding network and the audio generation model.

In technical solutions of the present disclosure, a collection, a storage, a use, a processing, a transmission, a provision, a disclosure and other processing of user personal information involved comply with provisions of relevant laws and regulations, and do not violate public order and good custom.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor. The memory stores instructions executable by the at least one processor, and the instructions, when executed by the at least one processor, are used to cause the at least one processor to implement the methods provided in the present disclosure.

According to embodiments of the present disclosure, a non-transitory computer-readable storage medium having computer instructions therein is provided, and the computer instructions are used to cause a computer to implement the methods provided in the present disclosure.

According to embodiments of the present disclosure, a computer program product containing a computer program is provided, and the computer program, when executed by a processor, is used to cause the processor to implement the methods provided in the present disclosure. A description will be given below with reference to FIG. 10.

Figure 10:
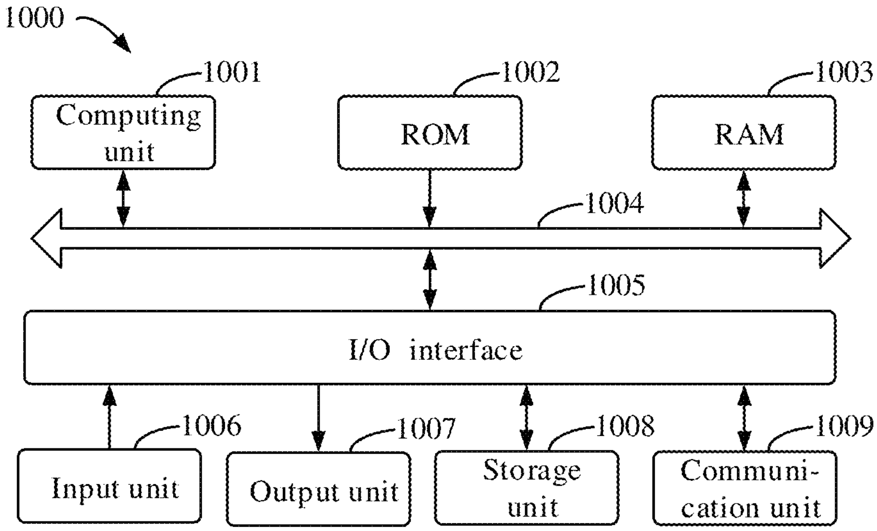
FIG. 10 shows a block diagram of an electronic device to which an audio generation method and/or a method of training an audio generation model may be applied according to an embodiment of the present disclosure.

FIG. 10 shows a schematic block diagram of an example electronic device 1000 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or dedicated processing assemblies having processing and computing capabilities. Some examples of the computing units 1001 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and processes described above, such as the audio generation method and/or the method of training the audio generation model. For example, in some embodiments, the audio generation method and/or the method of training the audio generation model may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the audio generation method and/or the method of training the audio generation model described above. Alternatively, in other embodiments, the computing unit 1001 may be used to perform the audio generation method and/or the method of training the audio generation model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A computer-implemented audio generation method, comprising:

fusing a target phoneme feature of a target text and a target semantic feature of the target text to obtain a target fusion feature, wherein the target phoneme feature is obtained by performing embedding on a target phoneme corresponding to the target text, and the target semantic feature is obtained by performing embedding on a target semantic representation corresponding to the target text;

obtaining an encoding feature according to the target fusion feature, a reference fusion feature and a reference audio feature, wherein the reference fusion feature is obtained by fusing a reference phoneme feature of a reference text and a reference semantic feature of the reference text, the reference phoneme feature is obtained by performing embedding on a reference phoneme corresponding to the reference text, the reference semantic feature is obtained by performing embedding on a reference semantic representation corresponding to the reference text, and the reference audio feature is obtained by encoding a reference audio corresponding to the reference text to obtain a plurality of discretized reference audio representations and performing embedding on the plurality of discretized reference audio representations; and decoding the encoding feature to obtain a target audio corresponding to the target text.

2. The method according to claim 1, wherein at least one target semantic sub-feature of the target semantic feature corresponds to at least one target phoneme sub-feature of the target phoneme feature, and the target fusion feature comprises at least one target fusion sub-feature obtained by fusing the target semantic sub-feature and the target phoneme sub-feature corresponding to the target semantic sub-feature.

3. The method according to claim 2, wherein the target semantic sub-feature corresponds to a plurality of target phoneme sub-features, and fusing the target phoneme feature and the target semantic feature to obtain the target fusion feature comprises:

fusing the plurality of target phoneme sub-features corresponding to the target semantic sub-feature with the target semantic sub-feature to obtain a plurality of target fusion sub-features.

4. The method according to claim 1, wherein the fusing a target phoneme feature of a target text and a target semantic feature of the target text to obtain a target fusion feature comprises:

determining the target phoneme feature according to the target text;

determining the target semantic feature according to the target text; and fusing the target phoneme feature and the target semantic feature to obtain the target fusion feature.

5. The method according to claim 4, wherein the target text comprises at least one target character, and the determining the target phoneme feature according to the target text comprises:

determining at least one target phoneme corresponding to the at least one target character; and performing embedding on the at least one target phoneme to obtain at least one target phoneme sub-feature of the target phoneme feature; and wherein the determining the target semantic feature according to the target text comprises:

determining at least one target semantic representation corresponding to the at least one target character; and performing embedding on the at least one target semantic representation to obtain at least one target semantic sub-feature of the target semantic feature.

6. The method according to claim 1, wherein at least one reference semantic sub-feature of the reference semantic feature corresponds to at least one reference phoneme sub-feature of the reference phoneme feature, and the reference fusion feature comprises at least one reference fusion sub-feature obtained by fusing the reference semantic sub-feature and the reference phoneme sub-feature corresponding to the reference semantic sub-feature.

7. The method according to claim 6, wherein the reference semantic sub-feature corresponds to a plurality of reference phoneme sub-features, and fusing the reference phoneme feature and the reference semantic feature to obtain the reference fusion feature comprises:

fusing the plurality of reference phoneme sub-features corresponding to the reference semantic sub-feature with the reference semantic sub-feature to obtain a plurality of reference fusion sub-features.

8. The method according to claim 1, wherein the reference fusion feature is obtained by fusing the reference phoneme feature of the reference text and the reference semantic feature of the reference text through:

determining the reference phoneme feature according to the reference text;

determining the reference semantic feature according to the reference text; and fusing the reference phoneme feature and the reference semantic feature to obtain the reference fusion feature.

9. The method according to claim 8, wherein the reference text comprises at least one reference character, and the determining the reference phoneme feature according to the reference text comprises:

determining at least one reference phoneme corresponding to the at least one reference character; and performing embedding on the at least one reference phoneme to obtain at least one reference phoneme sub-feature of the reference phoneme feature; and wherein the determining the reference semantic feature according to the reference text comprises:

determining at least one reference semantic representation corresponding to the at least one reference character; and performing embedding on the at least one reference semantic representation to obtain at least one reference semantic sub-feature of the reference semantic feature.

10. The method according to claim 1, wherein the obtaining an encoding feature according to the target fusion feature, a reference fusion feature and a reference audio feature comprises:

fusing the target fusion feature, the reference fusion feature and the reference audio feature to obtain a feature to be processed; and encoding the feature to be processed to obtain the encoding feature.

11. A non-transitory computer-readable storage medium having computer instructions therein, wherein the computer instructions are configured to cause a computer to implement the method of claim 1.

12. A computer-implemented method of training an audio generation model, comprising:

fusing a target phoneme feature of a target sample text and a target semantic feature of the target sample text to obtain a target fusion feature, wherein the target phoneme feature is obtained by performing embedding on a target phoneme corresponding to the target sample text, and the target semantic feature is obtained by performing embedding on a target semantic representation corresponding to the target sample text;

inputting the target fusion feature, a reference fusion feature and a reference sample audio feature into the audio generation model to obtain an encoding feature, wherein the reference fusion feature is obtained by fusing a reference phoneme feature of a reference sample text and a reference semantic feature of the reference sample text, the reference phoneme feature is obtained by performing embedding on a reference phoneme corresponding to the reference sample text, the reference semantic feature is obtained by performing embedding on a reference semantic representation corresponding to the reference sample text, and the reference sample audio feature is obtained by inputting a reference sample audio corresponding to the reference sample text into an audio encoding network to obtain a plurality of discretized reference sample audio representations and performing embedding on the plurality of discretized reference sample audio representations;

decoding the encoding feature to obtain a target sample audio corresponding to the target sample text; and training the audio generation model according to the target sample audio and a target audio label of the target sample text.

13. The method according to claim 12, wherein at least one target semantic sub-feature of the target semantic feature corresponds to at least one target phoneme sub-feature of the target phoneme feature, and the target fusion feature comprises at least one target fusion sub-feature obtained by fusing the target semantic sub-feature and the target phoneme sub-feature corresponding to the target semantic sub-feature; and wherein the target semantic sub-feature corresponds to a plurality of target phoneme sub-features, and fusing the target phoneme feature and the target semantic feature to obtain the target fusion feature comprises:

fusing the plurality of target phoneme sub-features corresponding to the target semantic sub-feature with the target semantic sub-feature to obtain a plurality of target fusion sub-features.

14. The method according to claim 12, wherein the fusing a target phoneme feature of a target sample text and a target semantic feature of the target sample text to obtain a target fusion feature comprises:

determining the target phoneme feature according to the target sample text;

determining the target semantic feature according to the target sample text; and fusing the target phoneme feature and the target semantic feature to obtain the target fusion feature.

15. The method according to claim 12, wherein at least one reference semantic sub-feature of the reference semantic feature corresponds to at least one reference phoneme sub-feature of the reference phoneme feature, and the reference fusion feature comprises at least one reference fusion sub-feature obtained by fusing the reference semantic sub-feature and the reference phoneme sub-feature corresponding to the reference semantic sub-feature; and wherein the reference semantic sub-feature corresponds to a plurality of reference phoneme sub-features, and fusing the reference phoneme feature and the reference semantic feature to obtain the reference fusion feature comprises:

fusing the plurality of the reference phoneme sub-features corresponding to the reference semantic sub-feature with the reference semantic sub-feature to obtain a plurality of reference fusion sub-features.

16. The method according to claim 12, wherein the reference fusion feature is obtained by fusing the reference phoneme feature of the reference sample text and the reference semantic feature of the reference sample text through:

determining the reference phoneme feature according to the reference sample text;

determining the reference semantic feature according to the reference sample text; and fusing the reference phoneme feature and the reference semantic feature to obtain the reference fusion feature.

17. The method according to claim 12, wherein the inputting the target fusion feature, a reference fusion feature and a reference sample audio feature into the audio generation model to obtain an encoding feature comprises:

fusing the target fusion feature, the reference fusion feature and the reference sample audio feature to obtain a feature to be processed; and inputting the feature to be processed into the audio generation model to obtain the encoding feature.

18. The method according to claim 12, wherein the decoding the encoding feature to obtain a target sample audio corresponding to the target sample text comprises:

inputting the encoding feature into an audio decoding network to obtain the target sample audio; and wherein the audio generation model is a large audio generation model, and the training the audio generation model comprises:

training the audio generation model among the audio encoding network, the audio decoding network and the audio generation model.

19. An electronic device, comprising:

at least one processor; and a memory communicatively connected to the at least one processor, wherein the memory stores instructions executable by the at least one processor, and the instructions, when executed by the at least one processor, are configured to cause the at least one processor to at least:

fuse a target phoneme feature of a target text and a target semantic feature of the target text to obtain a target fusion feature, wherein the target phoneme feature is obtained by performing embedding on a target phoneme corresponding to the target text, and the target semantic feature is obtained by performing embedding on a target semantic representation corresponding to the target text;

obtain an encoding feature according to the target fusion feature, a reference fusion feature and a reference audio feature, wherein the reference fusion feature is obtained by fusing a reference phoneme feature of a reference text and a reference semantic feature of the reference text, the reference phoneme feature is obtained by performing embedding on a reference phoneme corresponding to the reference text, the reference semantic feature is obtained by performing embedding on a reference semantic representation corresponding to the reference text, and the reference audio feature obtained by encoding a reference audio corresponding to the reference text to obtain a plurality of discretized reference audio representations and performing embedding on the plurality of discretized reference audio representations; and decode the encoding feature to obtain a target audio corresponding to the target text.

* * * * *